US012755035B2

(12) United States Patent
Tedri et al.

(10) Patent No.: US 12,755,035 B2
(45) Date of Patent: Oct. 6, 2026

(54) SECURE INTERPROCESS COMMUNICATION BRIDGE FOR SENSITIVE DATA TRANSFER

(71) Applicant: CyberArk Software Ltd., Petach-Tikva (IL)

(72) Inventors: Naor Tedri, Petach-Tikva (IL); Yonatan Volkov, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 18/677,085

(22) Filed: May 29, 2024

(65) Prior Publication Data

US 2025/0165626 A1 May 22, 2025

Related U.S. Application Data

(63) Continuation-in-part of application No. 18/514,199, filed on Nov. 20, 2023, now Pat. No. 12,001,567.

(51) Int. Cl.
*G06F 21/60* (2013.01)

(52) U.S. Cl.
CPC .................................. *G06F 21/606* (2013.01)

(58) Field of Classification Search
CPC .......... G06F 21/52; G06F 21/54; G06F 21/60; G06F 21/604; G06F 21/62–6281; H04L 63/10; H04L 63/20
See application file for complete search history.

(56) References Cited

U.S. PATENT DOCUMENTS

| | | | | |
|---|---|---|---|---|
| 9,442,752 | B1 | 9/2016 | Roth et al. | |
| 2020/0034540 | A1* | 1/2020 | Husson | G06F 21/57 |
| 2022/0004622 | A1 | 1/2022 | Paterson | |
| 2022/0291903 | A1 | 9/2022 | Kobayashi | |
| 2022/0391388 | A1 | 12/2022 | Gersht | |
| 2025/0061053 | A1* | 2/2025 | Hecht | G06F 11/3698 |
| 2025/0117806 | A1* | 4/2025 | Cain, Jr. | G06N 20/00 |
| 2025/0165626 | A1 | 5/2025 | Tedri et al. | |

OTHER PUBLICATIONS

International Search Report and Written Opinion issued in PCT International Application No. PCT/IB2026/054618, dated Jul. 28, 2026 (12 pages).
Sze, Wai Kit; Enhancing Multi-user OS with Network Provenance for Systematic Malware Defense, Sony Brook University, May 2016 (13 pages).

* cited by examiner

*Primary Examiner* — Kevin Bechtel
(74) *Attorney, Agent, or Firm* — Finnegan, Henderson, Farabow, Garrett & Dunner, LLP

(57) ABSTRACT

Systems, methods, and apparatuses are disclosed for securing the use of secondary processes using an interprocess communication bridge. Techniques may include identifying a sensitive data including at least one secret and invoking a secondary process in a computing environment in a suspended mode, wherein the secondary process is configured to perform at least one operation on a file associated with the sensitive data. Techniques may further include injecting at least one code element into the secondary process, the code element being configured to redirect the secondary process to the sensitive data and resuming the secondary process wherein the at least one operation is performed using the sensitive data.

20 Claims, 7 Drawing Sheets

600

600

SECURE INTERPROCESS COMMUNICATION BRIDGE FOR SENSITIVE DATA TRANSFER

CROSS-REFERENCE TO RELATED APPLICATIONS

This application is a continuation-in-part of, and claims the benefits of priority to, U.S. application Ser. No. 18/514, 199, filed Nov. 20, 2023, the entirety of which is hereby incorporated by reference.

BACKGROUND

Modern software platforms employ various identification means in the form of secrets. Secrets may include passwords, usernames, Application Programming Interface (API) keys, database credentials, symmetric or asymmetric encryption keys, hash values, identity and access management (IAM) permissions, SSH keys, tokens, certificates, biometric data, personal data and other credentials. Secrets may commonly be used for managing access permissions at both human-to-application and application-to-application levels of interaction. When used appropriately, secrets may provide users and applications with access to sensitive data, systems, and services that are otherwise secured.

Starting a process, such as a software application, may involve launching the process with a command line argument that includes a secret. Command line arguments may be visible to other administrator users on the server. In some cases, command line arguments may be written to an event log or may be sent to a security information and event management system. Where sensitive information such as secrets are used in the command line arguments, such information may be exposed to unauthorized users or malicious actors. For example, malicious actors may employ means to review a command line event log to gather or collect secrets to gain unauthorized access to an application or resource, as well as additional secrets and hosts.

Technological solutions are thus needed to protect secrets when used in command line events when launching a new process, such as an application. Such solutions should prevent malicious usage of secrets in the event that a command line event log is accessed or compromised. Such solutions should include invoking, by a main process, a secondary process in a computing environment in a suspended mode and providing one or more placeholder command line entry to the secondary process. Solutions may also include retrieving a secret by the main process, and storing an operable command line entry, which may include a secret or other information, in a memory location associated with the secondary process. Solutions may also include nullifying the one placeholder command line entry and enabling the operable command line entry and use the at least one secret.

Other problems may arise in securing secrets for certain processes offered on closed-source systems. For example, certain applications may require that certain system calls or data transfers are made to or from a local disk. As one example, a Microsoft Windows® remote desktop protocol ("RDP") file is a plain text file that may not be digitally signed in a traditional way using public key infrastructure. Instead, a signing block may be added to the end of the file with signature and sign scope keys, where the signature block calculation is performed by RDPsign.exe, an executable provided by Microsoft. That executable may access RDP files saved on the local disk and may place signed RDP files on the disk. However, a RDP file may contain sensitive data and recording such sensitive data to a local disk poses a security risk in that the local disk may be unsecure or susceptible to access by malicious attackers. Closed source or black box applications, such as RDPsign.exe, may not allow for retrieving sensitive data from secure locations or may not be able to write files containing sensitive data to secure locations using conventional techniques.

Technological solutions are thus needed to securely send sensitive data to black box or closed source processes for example, by creating a file that does not contain the actual data and overriding certain file system calls with updated logic to receive or write sensitive data from or to a different source than the one expected by the black box or closed source process. Such solutions should include identifying, by a main process a sensitive data containing at least one secret and invoking, by the main process, a secondary process in a computing environment in a suspended mode, wherein the secondary process is configured to perform at least one operation on a file associated with the sensitive data. Solutions should further include injecting at least one code element into the secondary process that redirects the secondary process to the sensitive data, and resuming the secondary process, wherein the at least one operation is performed using the sensitive data. Solutions may also include generating a placeholder file based on the sensitive data, the placeholder file excluding the at least one secret. Solutions may also include generating a modified sensitive data based on the sensitive data.

SUMMARY

The disclosed embodiments describe non-transitory computer readable media, systems, and methods for securing the use of command line entries. For example, in an embodiment, a non-transitory computer readable medium may include instructions that, when executed by at least one processor, cause the at least one processor to perform operations for securing the use of command line entries. The operations may include invoking, by a main process, a secondary process in a computing environment in a suspended mode and providing one or more placeholder command line entry to the secondary process. The operations may further include retrieving at least one secret by the main process and storing an operable command line entry in a memory location associated with the secondary process, wherein the one or more placeholder command line entry is nullified, wherein the secondary process is configured to process the operable command line entry and use the at least one secret. In an embodiment, the operations may further include resuming the secondary process.

According to a disclosed embodiment, the operable command line entry may include the at least one secret. In another embodiment, the operable command line entry may be configured to assert the secret to access a protected asset. In yet another embodiment, the one or more placeholder command line entry may have a size that is equal to or larger than a size of the operable command line entry.

According to a disclosed embodiment, the operations may further comprise resuming the secondary process.

According to a disclosed embodiment, nullifying the one or more placeholder command line entry may include deleting the one or more placeholder command line entry. In another embodiment, nullifying the one or more placeholder command line entry may include overwriting the one or more placeholder command line entry with the operable command line entry.

According to a disclosed embodiment, the secondary process may be suspended immediately upon its initial execution. In another embodiment, the secondary process may be suspended before it processes any command line entries. In yet another embodiment, the operations may further include deleting the operable command line entry from the memory location associated with the secondary process after the secret is used.

According to another disclosed embodiment, a computer-implemented method for securing the use of command line entries may include invoking, by a main process, a secondary process in a computing environment in a suspended mode and providing one or more placeholder command line entry to the secondary process. The method may further include retrieving at least one secret by the main process and storing an operable command line entry in a memory location associated with the secondary process, wherein the one or more placeholder command line entry is nullified. The secondary process may be configured to process the operable command line entry and use the at least one secret.

According to a disclosed embodiment, the memory location associated with the secondary process may be a process environment block. In another embodiment, the operable command line entry may be accessed from the process environment block by the secondary process. In another embodiment, the operable command line entry may be accessed from one or more stack arguments located in a call stack associated with a thread in the secondary process.

According to a disclosed embodiment, the operable command line entry may be located using an operating system application programming interface. In another embodiment, the operable command line entry may not be made available to an auditing tool. In yet another embodiment, the one or more placeholder command line entry may be made available to an auditing tool.

According to a disclosed embodiment, the at least one secret may be retrieved from a secure secret storage location. In another embodiment, the at least one secret may be obtained from user input prior to the execution of the secondary process. In another embodiment, the secondary process may be resumed after the operable command line entry is stored in the memory location associated with the secondary process. In yet another embodiment, the method may further include deleting the operable command line entry from the process environment block after the secret is used.

According to another disclosed embodiment, a non-transitory computer readable medium may include instructions that, when executed by at least one processor, cause the at least one processor to perform operations for securing the use of secondary processes using an interprocess communication bridge. The operations may include identifying, by a main process, a sensitive data including at least one secret and invoking, by the main process, a secondary process in a computing environment in a suspended mode, wherein the secondary process is configured to perform at least one operation on a file associated with the sensitive data. The operations may further include injecting, by the main process, at least one code element into the secondary process, the code element being configured to redirect the secondary process to the sensitive data; and resuming the secondary process, wherein the at least one operation is performed using the sensitive data.

According to a disclosed embodiment, the operations may further include generating a placeholder file based on the sensitive data, the placeholder file excluding the at least one secret. In another embodiment, operations may include generating, by the secondary process, a modified sensitive data based on the sensitive data. In another embodiment, the operations may further include making the placeholder file available to the secondary process.

According to a disclosed embodiment, injecting the at least one code element may include overwriting a read file system call of the secondary process. In yet another embodiment, injecting the at least one code element may include overwriting a write file system call of the secondary process.

According to a disclosed embodiment, redirecting the secondary process to the sensitive data may include redirecting the secondary process from a location of the placeholder file to the sensitive data. In an embodiment, the location of the placeholder file may be an unsecured location.

According to a disclosed embodiment, the operations may further include receiving, from a data holder, a request for the modified sensitive data. In another embodiment, the operations may further comprise providing the modified sensitive data to the data holder in response to the request.

In another embodiment, identifying the sensitive data including at least one secret may include accessing the sensitive data via an interprocess communication bridge. In yet another embodiment, redirecting the secondary process to the location of the sensitive data may include redirecting the secondary process via the interprocess communication bridge.

According to a disclosed embodiment, a computer-implemented method for securing the use of secondary processes using an interprocess communication bridge may include identifying, by a main process, a sensitive data including at least one secret, and invoking, by the main process, a secondary process in a computing environment in a suspended mode, wherein the secondary process is configured to perform at least one operation on a file associated with the sensitive data. The computer-implemented method may further include injecting, by the main process, at least one code element into the secondary process, the code element being configured to redirect the secondary process to the sensitive data, and resuming the secondary process, wherein the at least one operation is performed using the sensitive data.

In an embodiment, the computer-implemented method may further include generating a modified sensitive data based on the sensitive data and writing the modified sensitive data to a secure location. In another embodiment, the modified sensitive data may be in the format of a remote desktop protocol file. In another embodiment, the at least one code element may be further configured to generate an indication that the at least one code element has been injected into the secondary process, and the secondary process may be resumed based on the indication.

According to a disclosed embodiment, the file associated with the sensitive data may be a remote desktop protocol file, and the modified sensitive data may be data in the format of a signed remote desktop file. In another embodiment, the data in the format of a signed remote desktop protocol file may include a signature block. In an embodiment, the code element may be a dynamic-link library. In another embodiment, the secondary process may be suspended immediately upon its initial execution. In yet another embodiment, the secondary process may be suspended before it processes any filesystem calls.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
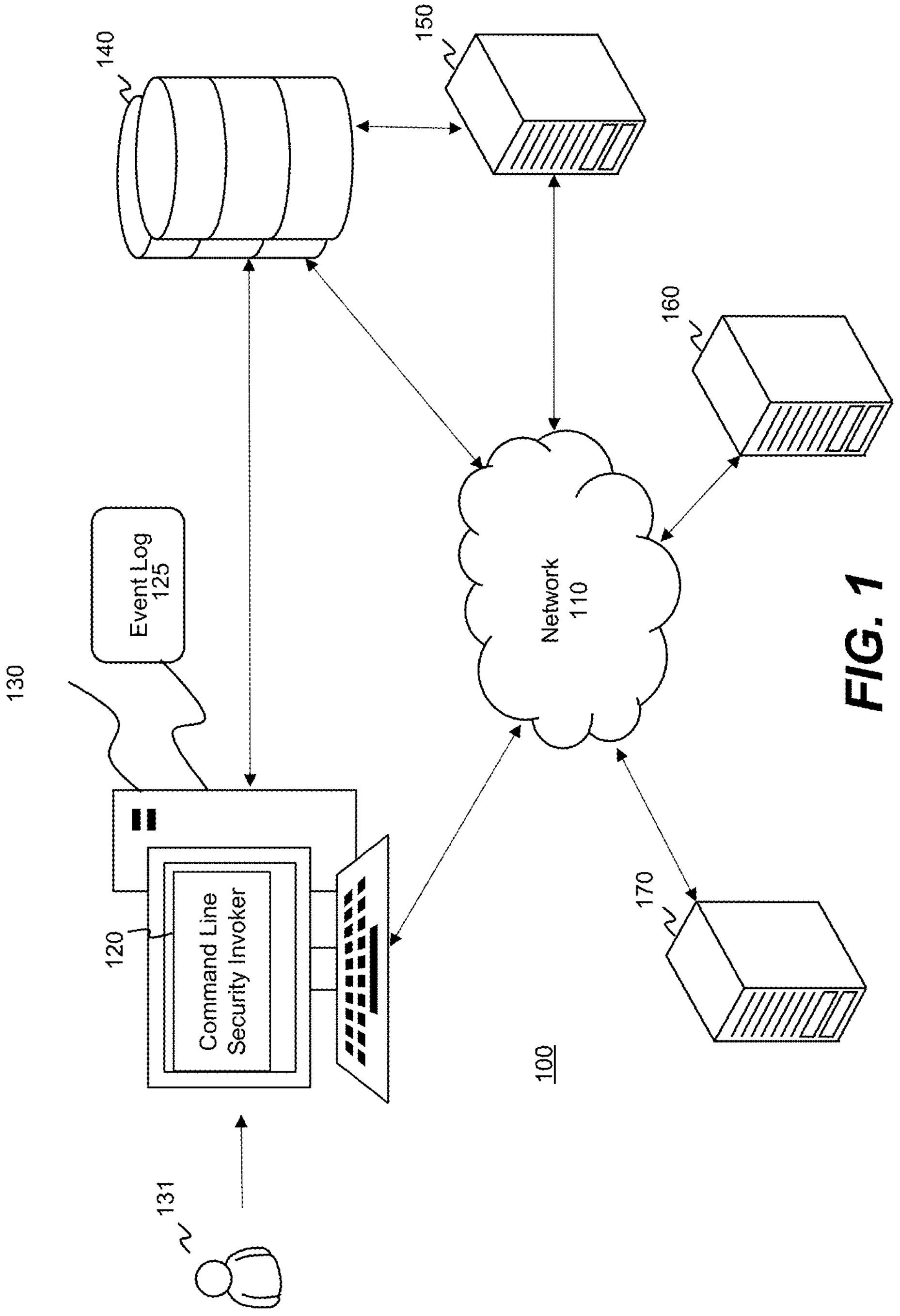
FIG. 1 is a block diagram of an exemplary system for securing the use of command line entries in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for securing the use of command line entries described herein overcome several technological problems related to security, efficiency, and functionality in the fields of cybersecurity and software management. In particular, the disclosed embodiments provide techniques for securing secrets otherwise recorded in or accessible through event logs or other systems that record, receive, retrieve or otherwise get and may enable access to such event logs, from malicious attacks. As discussed above, malicious actors may target such event logs or systems to access secrets. Existing techniques fail to secure secrets when used in a command line interface upon process launch when command line entries are otherwise logged or recorded.

The disclosed embodiments provide technical solutions to these and other problems arising from current techniques. For example, disclosed techniques may improve security by shielding or masking the secrets from input into a command line and by preventing the secret's entry into an event log or other data recorded, thus minimizing the chances of success by a malicious actor seeking secret information. Disclosed techniques for securing the use of command line entries may further be combined with security monitoring and enforcement programs. For these, and other reasons that will be apparent to those skilled in the art, the disclosed techniques provide improved security, performance, and efficiency over existing techniques.

Aspects of the present disclosure may include a computer process. A computer process may be code that is executable and can receive arguments to enable its execution. An example of a computer process may be an application program or application, but processes are not limited to application programs and may also include tasks related to the operation of an operating system, a virtual machine, a BIOS, firmware, or any other executable. An application program may be a computer program designed to carry out a specific task, other than one relating to the operation of the computer itself. Applications may typically be used by end-users, and may include word processing documents, productivity programs for generating presentations, worksheets, databases, charts, graphs, digital paintings, electronic music and digital video, banking or financial software, or any other application software.

Aspects of the present disclosure may include secrets. A secret may include passwords, user names, Application Programming Interface (API) keys, database credentials, encryption keys, hash values, identity and access management (IAM) permissions, SSH keys, tokens, certificates, biometric data, personal data and other credentials to grant permission to an identity (e.g., user, account, application, agent, virtual instance, etc.). An application may use a secret to access a resource or target service, perform a function, validate a user, or proceed with an execution step. A secret may provide users and applications with access to sensitive data, systems, and services that are otherwise secured or restricted.

Reference will now be made in detail to the disclosed embodiments, examples of which are illustrated in the accompanying drawings.

FIG. 1 illustrates an exemplary system 100 for securing the use of command line entries, consistent with the disclosed embodiments. System 100 may include one or more of a command line security invoker 120, one or more computing devices 130, one or more databases 140, and one or more servers 150, as shown in FIG. 1. System 100 may also include application server 160 and credentials management server 170.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™ IBM Cloud™, etc.), or other types of non-terminal operating systems. As discussed further below, computing devices 130 may be used for executing software applications, functions, or scripts. For example, a user 131 may execute certain applications by interfacing with computer device 130.

Computer device 130 may include an event log 125. An event log may be a record of events related to the system, security, and application stored on an operating system. The event log 125 may store information about different events that occur within system 100, such as system information, application information, operation setup information, and security information. Event log 125 may include information about errors occurring within the installed software on a computing device 130. The event log 125 may contain data about security events on the system, or installation-related events. Event log 125 may log command line entries associated with the startup and use of applications running within the system 100 or the computing device 130. Example event logs may include the Windows event log, the console app on MacOS, a Linux log, or any other logging tool capable to logging command line information. An event log may export such logs of events or other information to additional systems that might store, access, retrieve, analyze or otherwise process or enable access to such data. Of course, in other embodiments, event log 125 may be located on devices other than computing device 130. For example, event log 125 may be located on server 150, application server 160, secret manager 170, another computing device, an external SIEM system, or any other computing device or server. Event log 125 may be located on the same computing device or server that contains command line security invoker 120, or the event log 125 and command line security invoker 120 may each be located on different computing devices or servers.

System 100 may further comprise one or more database(s) 140, for storing and/or executing software. For example, database 140 may be configured to store software or code, such as code or build scripts developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of subordinate databases, load balancers, dummy servers, firewalls, back-up databases, and/or any other desired database components. In some embodiments, database 140 may be employed as a cloud service, such as a Software as a Service (SaaS) system, a Platform as a Service (PaaS) system, or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vmWare™, or other cloud computing providers. Data sharing platform 140 may also include other commercial file sharing services, such as Dropbox™, Google Docs™, or iCloud™, etc. In some embodiments, database 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where application code is accessed within system 100, server device 150 may manage various stages of the process, for example, by managing communications between computing devices 130 and databases 140 over network 110. Server device 150 may identify application code in database 140, may receive updates when new or revised application code is entered in database 140, and may participate in securing the use of command line entries.

System 100 may also include application server 160. Application server 160 may be a server associated with a process, such as an application, running on computing device 130. In an embodiment, an application running on computing device 130 may connect to application server 160 using credentials or secrets. Application server 160 may receive data from and provide data to an application client running on computing device 130 when an application is executed.

System 100 may also include secret management server 170. Secret management server 170 may store credentials or secrets associated with an application. Secret management server 170 may be a secret vault solution where the secrets are managed, created, stored, or accessed. Secret management server 170 may communicate with computing device 130, database 140, server 150 and application server 160 to store, create, manage, and provide secrets or other credentials associated with an application or a user 131.

Command line security invoker 120 may be any device, component, program, script, or the like, for securing the use of command line entries within system 100, as described in more detail below. Command line security invoker 120 may be configured to monitor components within system 100, including computing device 130, and may communicate with database 140, server 150, application server 160, or secret management server 170. In some embodiments, command line security invoker 120 may be implemented as a separate component within system 100, capable of retrieving or generating secrets and injecting them into application instances running within network 110. In other embodiments, command line security invoker 120 may be a program or script and may be executed by another component of system 100 (e.g., integrated into computing device 130, database 140, server 150), application server 160 or secret management server 170).

Figure 2:
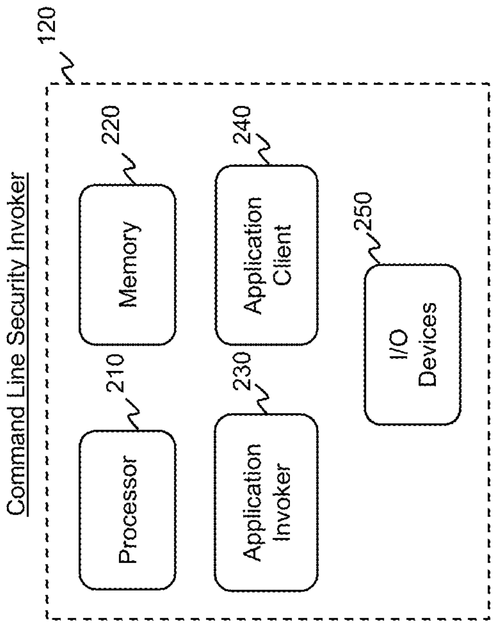
FIG. 2 is a block diagram showing an exemplary command line security invoker in accordance with disclosed embodiments.

Command line security invoker 120 may comprise additional elements to facilitate analysis of software, code, functions, and/or scripts, and injection of secrets into software instance environments within system 100. FIG. 2 is a block diagram showing an exemplary command line security invoker 120 in accordance with disclosed embodiments. For example, command line security invoker 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments, command line security invoker 120 may be employed as a cloud service, such as a Software as a Service (SaaS) system, a Platform as a Service (PaaS), or Infrastructure as a Service (IaaS) system. For example, command line security invoker 120 may be based on infrastructure of services of Amazon Web Services™ (AWS™), Microsoft Azure™, Google Cloud Platform™, Cisco Metapod™, Joyent™, vmWare™, or other cloud computing providers. In an embodiment, command line security invoker 120 may be integrated with a host that operates as a node in a cluster, for example, a Kubernetes™ node, and the node may further include software instance environments such as containers. In another embodiment, command line security invoker 120 may be a container deployed on a node, or it may be deployed in a layer separate from software containers. In another embodiment, command line security invoker 120 is a software application running on computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to secure the use of command line entries used when initiating a software instance from computing device 130, for example, using process 500, as described in detail below. The disclosed embodiments are not limited to software programs or devices configured to perform dedicated tasks. For example, the memory 220 may store a single program, such as a user-level application, which performs the functions of the disclosed embodiments or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Command line security invoker 120 may further comprise one or more components for performing various operations of the disclosed embodiments. For example, command line security invoker 120 may contain application invoker 230 and application client 240. Application invoker 230 may be configured to store, access, or run a process, such as an application, from memory, which may be memory 220. For example, application invoker 230 may be configured to access and inspect computing device 130, database 140, or server 150 for application code, launch the application in a suspended state, and may write code including secrets into a memory storage location of the application. In some embodiments, application invoker 230 may also be configured to retrieve secrets from a secret management database or server, such as secret management server 170.

Command line security invoker 120 may include application client 240. Application client 240 may be associated with the application and may receive secrets or other credentials from application invoker 230. Application client 240 may communicate with application server 160 to provide the secrets or other credentials. Application server 160 may provide information or other data desirable by the user 131 to the application client 240 when launching the application. As an example, application client 240 may be a banking application on a user's computer and application server 160 may be a banking institution. In this embodiment, application client 240 may provide login information to the banking application computer (application server 160) and may retrieve financial data pertaining to the user's account. Applications are not limited to financial software and may generally include any software applications involving an exchange of login information between a client application and a server application.

Command line security invoker 120 may include one or more input/output (I/O) devices 250. I/O devices 250 may include one or more network adaptors or communication devices and/or interfaces (e.g., Wi-Fi, Bluetooth®, RFID, NFC, RF, infrared, Ethernet, etc.) to communicate with other machines and devices, such as with other components of system 100 through network 110. For example, command line security invoker 120 may use a network adaptor to identify applications stored within system 100. In some embodiments, the I/O devices 250 may also comprise a touchscreen configured to allow a user to interact with hidden secret detector 120 and/or an associated computing device. The I/O devices 250 may comprise a keyboard, mouse, trackball, touch pad, stylus, and the like. Like processor 210 and memory 220, in embodiments where command line security invoker 120 is executed as software or code, I/O devices 250 may be associated with another component of system 100.

Figure 3:
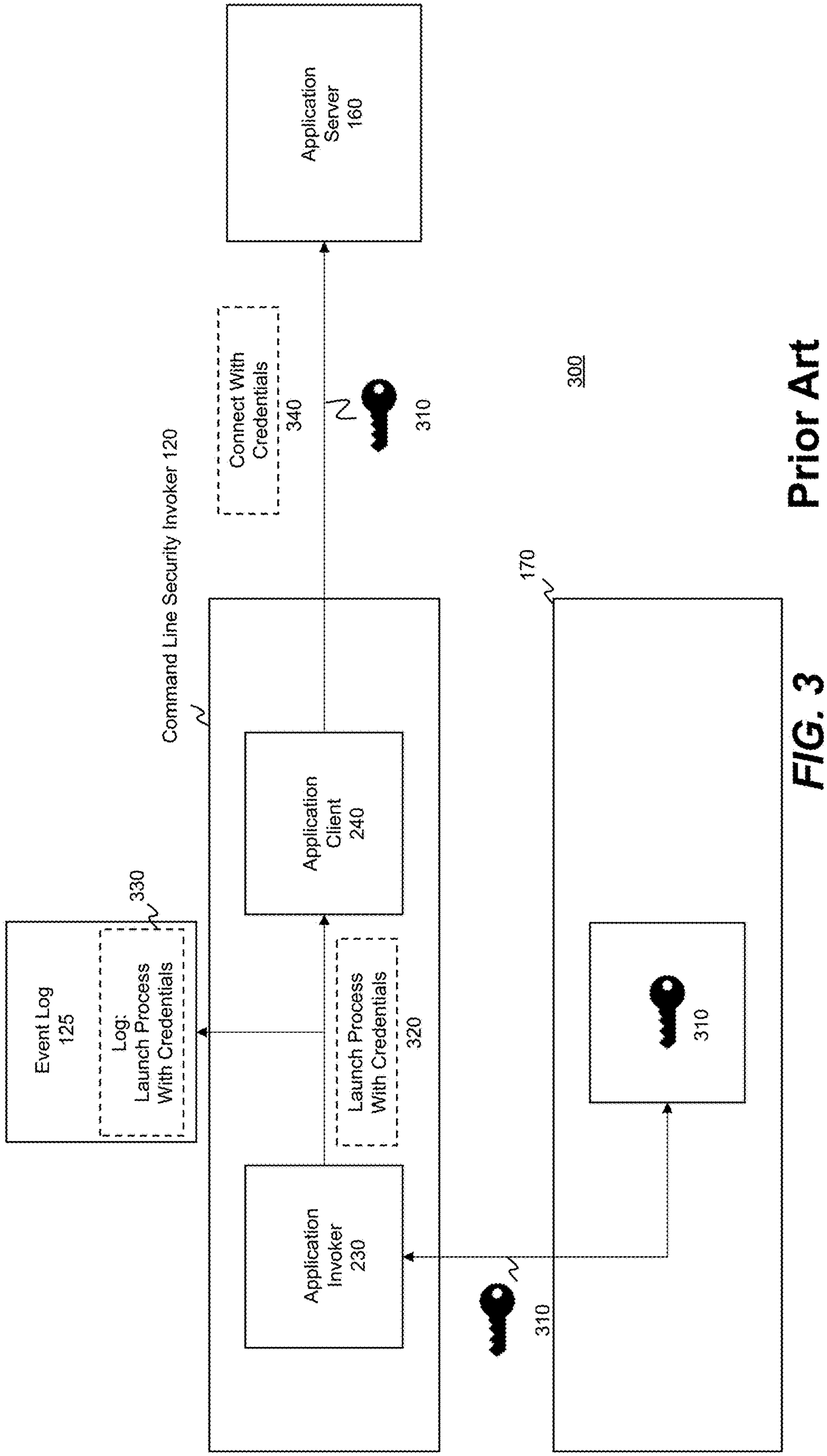
Prior Art FIG. 3
FIG. 3 is a process flow diagram depicting use of command line entries when launching an application according to known techniques.

FIG. 3 is a process flow diagram 300 depicting use of command line entries when launching an application according to known techniques. During the process, application invoker 230 may launch an application. As an optional step, application invoker 230 may retrieve secret 310 from secret management server 170. Application invoker 230 may then launch the application using the secret 310 in step 320 by communicating the secret to application client 240. At step 330, and as the application is launched, event log 125 may record the event that the application is launched with secret 310, and in the process, stores the secret 310 to the event log 125. At step 340, application client 240 connects to the application server 160 using secret 310. In this conventional process, secret 310 is stored in the event log 125 and exposed to inspection or review.

Figure 4:
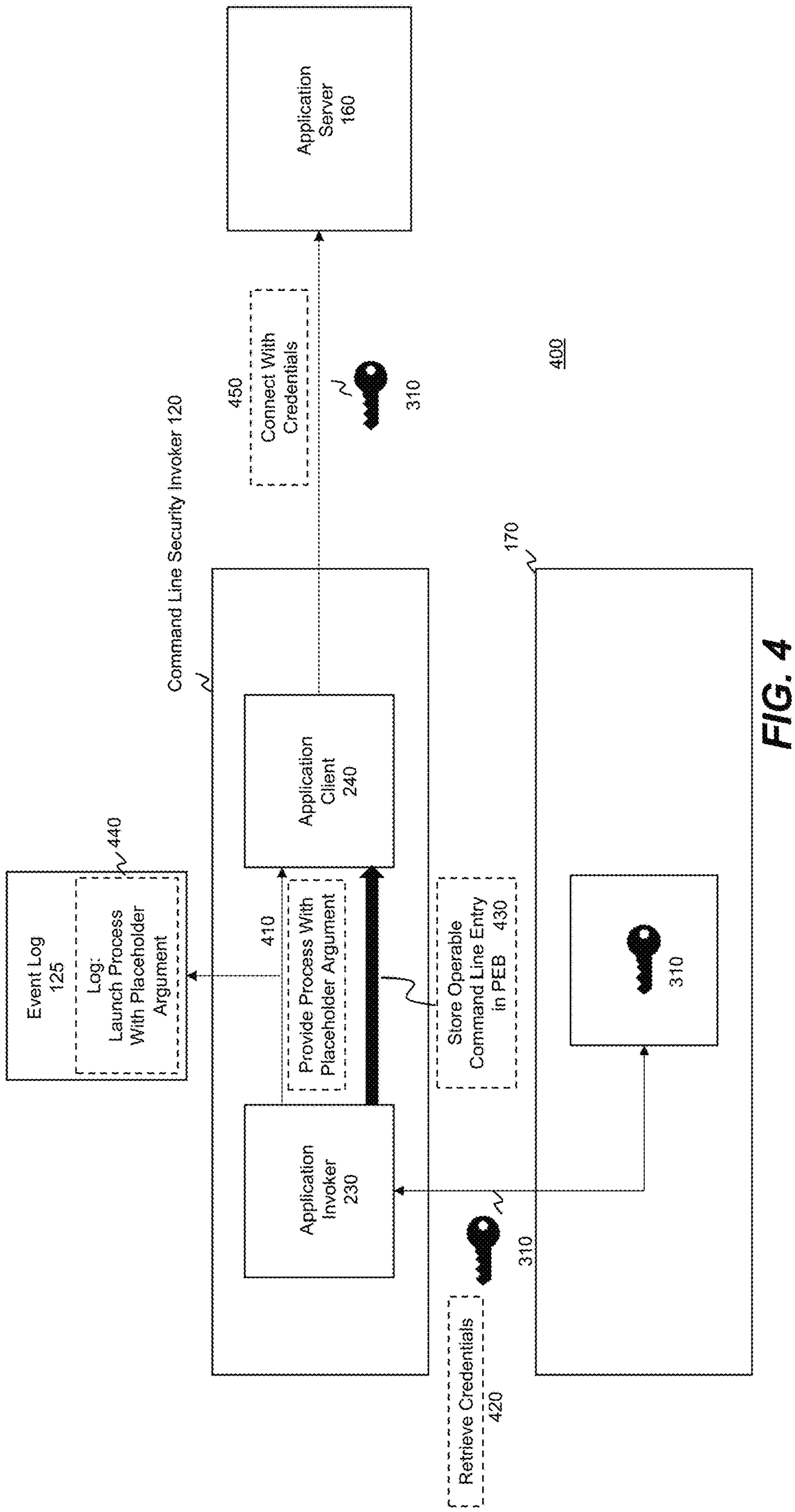
FIG. 4 is a process flow diagram implementing a method for securing the use of command line entries in accordance with disclosed embodiments.

FIG. 4 is a process flow diagram implementing a process for securing the use of command line entries in accordance with disclosed embodiments. The process 400 may include invoking, by a main process, a secondary process in a computing environment. A main process may be a program or application configured to invoke a secondary process. In an embodiment, the main process may be command line security invoker 120. The main process may be configured to interact with legacy software or other applications that accept parameters in a command line argument. In some embodiments, a main process may be installed in a secure environment and may be considered trusted or secured by a user. FIG. 4 depicts an embodiment of a main process in the form of command line security invoker 120.

A secondary process may include any code or executable that accepts arguments for execution of the code. In an embodiment, the secondary process may be an application that is launched or executed by the main process, and the secondary process may be an application that requires a command line argument to launch or execute the application. The command line argument may be or include, for example, a user credential or a secret. FIG. 4 depicts an embodiment of a secondary process in the form of application client 240.

In some embodiments, the main process may invoke the secondary process in a suspended mode. Invoking in a suspended mode may generally include operations to launch the secondary process prior to registering an event in an event log. For example, invoking a secondary process in a suspended mode may include assigning memory locations, loading operating system DLLs, or allocating resources but not yet recalling specific code from the secondary process. In an embodiment, invoking the secondary process in a suspended mode may include suspending the secondary process immediately upon its initial execution. For example, the primary process may assign memory locations or load background resources and then halt processing of any more code from the secondary process application. In other embodiments, the secondary process may be suspended before it processes any command line entries.

Aspects of the present disclosure may include operable command line entries and placeholder command line entries. An operable command line entry may be a command line entry that a secondary process considers to be valid or operable to proceed with executing a function. For example, a secondary process may require an operable command line entry in the form of a valid secret to be entered into a command line to launch the secondary process or to communicate with an application server.

A placeholder command line entry may be a command line entry that is related to an argument associated with the operation of the secondary process. In an embodiment, the placeholder command line entry may be inoperable or invalid. A placeholder command line entry may be a command line entry that has a size that is equal to or larger than the memory size of the operable command line entry but is otherwise invalid. For example, if a secondary process requires an operable command line entry of a password credential of "1234," a placeholder command line entry may be "####." A placeholder command line entry may also be a different size than an operable command line entry, but in some embodiments, may correspond with the same argument as the operable command line entry.

In some embodiments, process 400 may include providing one or more placeholder command line entry to the secondary process. The placeholder command line entry may be provided to the secondary process when the secondary process is suspended. For example, at step 410, application invoker 230 may provide a placeholder command line entry to application client 240. In some embodiments, placeholder command line entry may be generated by application invoker 230.

In some embodiments, process 400 may include step 420 of retrieving at least one secret by the main process. A secret may be stored in a secure storage location, for example, secret management server 170. For example, application invoker 230 may contact secret management server 170 and retrieve secret 310. Secrets may also be obtained from other sources. For example, secrets may be obtained from a user through user input prior to the execution of the secondary process.

In some embodiments, process 400 may include step 430 to store an operable command line entry in a memory location associated with the secondary process. Storing an operable command line entry in a memory location associated with the secondary process may be performed by the main process, such as application invoker 230 or command line security invoker 120. In an embodiment, the operable command line entry may include at least one secret, and may, for example, include secret 310. The operable command line entry may be configured to assert the secret to access a protected asset. For example, if the secret is a user credential, the secondary process may assert the secret to overcome a challenge within its operating code, or to access an external resource. In an embodiment, application invoker 230 may store secret 310 in a memory location of application client 240 which enables application client 240 to access an external resource such as application server 160. In an embodiment, the one or more placeholder command line entry has a size that matches a size of the operable command line entry. Size may refer to memory (i.e., bits), characters, or other properties.

In an embodiment, the memory location where the operable command line entry is stored in the secondary process may be located using an operating application programming interface (API). For example, the main process may query a program function using an API, such as Windows® API to find a memory a location associated with the command line entry associated with step 410. In an embodiment, the memory location associated with the secondary process may be a process environment block ("PEB"). The PEB may be a data structure whose fields are typically used by the operating system.

In another embodiment, the secondary process may access the operable command line through one or more stack arguments located in a call stack associated with a thread in the secondary process, including but not limited to the main thread of the secondary process, or another stack data structure. A thread may be a sequence of programmed instructions and may be associated with the secondary process. Stack arguments may include information about active subroutines of a process or application and may include an operable command line argument. For example, stack arguments may be copied from a PEB into the stack, or alternatively, through registers. The operable command line argument may then be accessed from the call stack using, for example, an array parameter by the secondary process. In an embodiment, the operable command line entry may be accessed by the secondary process by examining the stack of the main thread of the secondary process. In other embodiments, the operable command line argument may be accessed in any thread's stack. For example, the main thread of a secondary process may call other threads associated with the secondary process to retrieve values for the operable command line argument.

In an embodiment, the secondary process may launch with the placeholder argument entered into the command line entry in a suspended mode. The secondary process may be resumed from the suspended mode after the operable command line entry is stored in the memory location associated with the secondary process.

At step 440, event log 125 may record that the secondary process launched with the placeholder argument and not an operable command line entry. By storing the operable command line entry in a memory location associated with the secondary process, the operable command line entry may not be made available to an auditing tool or event log 125. At the same time, the placeholder command line entry may be made available to an auditing tool or event log. In this way, the secret used in launching the secondary process may be protected.

In some embodiments, the one or more placeholder command line entry may be nullified. Nullifying the one or more placeholder command line entry may include deleting the one or more placeholder command line entry. In other embodiments, nullifying the one or more placeholder command line entry may include overwriting the one or more placeholder command line entry with the operable command line entry.

In some embodiment, at step 450, the secondary process may be configured to process the operable command line entry and use the at least one secret. Processing and using the operable command line entry may include the secondary process executing a function depending on the operable command line entry. In one example, application client 240 may connect with application server 160 using secret 310. In other embodiments, the secondary process may resolve an internal argument based on the operable command line entry that allows the secondary application to execute the remainder of its code. In an embodiment, the operable command line entry may be accessed from the process environment block by the secondary process.

In some embodiments, the operations may include deleting the operable command line entry from the memory location associated with the secondary process after the secret is used. Deleting the operable command line entry may include deleting the operable command line entry from the process environment block after the secret is used.

Figure 5:
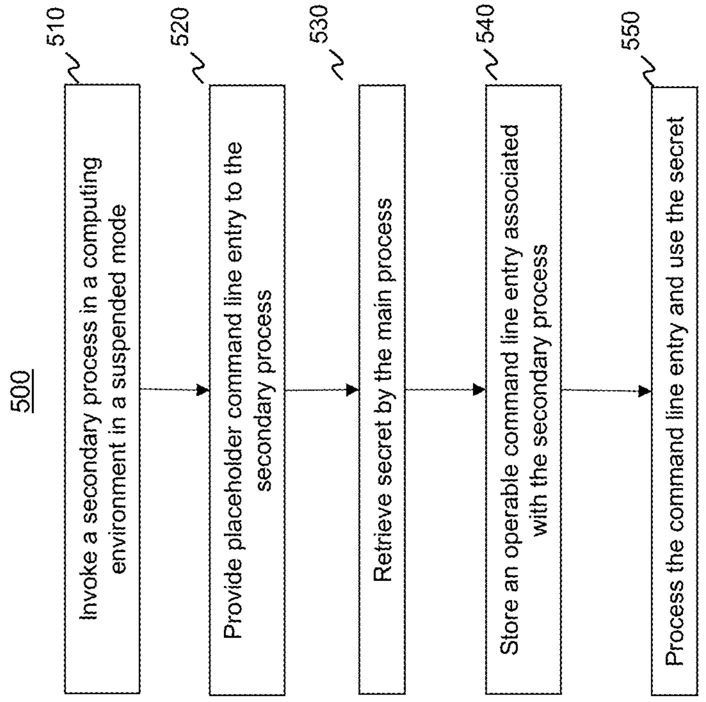
FIG. 5 is a flowchart depicting an exemplary process for securing the use of command line entries in accordance with disclosed embodiments.

FIG. 5 is a flowchart depicting an exemplary process securing the use of command line entries in accordance with disclosed embodiments. Process 500 may be similar to process 400 described above. For example, process 500 may be performed by command line security invoker 120, application invoker 230, and application client 240, processor 210, or a combination thereof. Accordingly, any of the various functions or elements described above with respect to process 400 may equally apply to process 500, and vice versa.

Step 510 may include invoking, by a main process, a secondary process in a computing environment in a suspended mode. As described herein, a main process may be a program or application configured to invoke a secondary process. Invoking in a suspended mode may generally include operations to launch the secondary process prior to registering an event in an event log 125. For example, invoking a secondary process in a suspended mode may include assigning memory locations, loading operating system DLLs, or allocating resources but not yet recalling specific code from the secondary process. In an embodiment, invoking the secondary process in a suspended mode may include suspending the secondary process immediately upon its initial execution. For example, the primary process may assign memory locations or load background resources and then halt processing of any more code from the secondary process application. In other embodiments, the secondary process may be suspended before it processes any command line entries. A main process may be, for example, application invoker 230, and a secondary process may be application client 240.

At step 520, process 500 may include providing one or more placeholder command line entry to the secondary process. Accordingly, step 520 may substantially correspond with step 410 of process 400.

At step 530, process 500 may include retrieving at least one secret by the main process. Accordingly, step 530 may substantially correspond with step 420 of process 400.

At step 540, process 500 may include storing an operable command line entry in a memory location associated with the secondary process. Accordingly, step 540 may substantially correspond with step 430 of process 400.

At step 550, process 500 may include processing, by the secondary process, the command line entry and use of the secret. Accordingly, step 550 may substantially correspond with step 450 of process 400.

Aspects of the present disclosure include techniques for securing the use of secondary processes using an interprocess communication bridge. Inter-process communication ("IPC") may refer to certain mechanisms provided by an operating system that allow processes to communicate with each other and synchronize their actions. For example, when multiple processes are running concurrently, they may need to exchange data or coordinate their activities. IPC provides a way for processes to interact and share information. One example method of IPC involves shared memory. In the shared memory method, processes may share a common memory region where they can read from and write to. Another method involves message passing. In message passing, processes communicate by sending messages to each other. Each process may have its own address space, and messages are explicitly sent and received. In other words, an IPC bridge allows processes to exchange data and messages.

The disclosed techniques for securing the use of secondary processes using an interprocess communication bridge overcome several technological problems related to security, efficiency, and functionality in the fields of cybersecurity and software management. In particular, the disclosed embodiments provide techniques for securing secrets or sensitive data accessible by black box or closed source processes that might otherwise read, record or require those secrets on a local disk or other unsecured location. Disclosed solutions may improve security by shielding or masking the secrets by manipulating the system calls of certain processes from an expected file location to the location of the secret, a location that may be secured. Disclosed techniques for securing the use of secondary processes using an interprocess communication bridge may further be combined with security monitoring and enforcement programs. For these, and other reasons that will be apparent to those skilled in the art, the disclosed techniques provide improved security, performance, and efficiency over existing techniques.

Figure 6:
FIG. 6 is a diagram depicting an exemplary process for securing the use of secondary processes using an interprocess communication bridge in accordance with disclosed embodiments.

FIG. 6 is a diagram depicting an exemplary process for securing the use of secondary processes using an interprocess communication bridge in accordance with disclosed embodiments. Process 600 may include execution commands, communication calls, or other processing actions transmitted between one or more processes or programs. As one example, process 600 includes three computer processes in the form of data holder 610, main process 620, and secondary process 630. In an embodiment, data holder 610, main process 620, and secondary process 630 may each be separate computer programs operating a computing device 130. In another embodiment, data holder 610 may be a program operating on applications server 160 while main process 620 and secondary process 630 run on computing device 130. In other embodiments, each of data holder 610, main process 620, and secondary process 630 may operate on different computing devices 130, or different servers or databases, or may operate in a distributed network through a cloud-based networking system.

In an embodiment, data holder 610 may hold sensitive data such as secrets. Data holder 610 may be a known secure location for holding secrets. In another embodiment, data holder 610 may have access to and communicate with a repository of sensitive data such as secret management server 170. In another embodiment, data holder 610 may be a program that enables both end users and administrators to access and manage privileged accounts from any local or remote location through a web client. An example data holder may include CyberArk® Password Vault Web Access (PVWA) platform.

At step 635, data holder 610 may invoke a main process, such as main process 620. Invoking the main process may generally include operations to launch the main process. In an embodiment, main process 620 may be the process that oversees invoking and communication with other processes, such as secondary process 630.

In some embodiments, securing the use of secondary processes using an interprocess communication bridge may include identifying, by a main process, a sensitive data including at least one secret. In some embodiments, identifying a sensitive data may include receiving the sensitive data from another process or a thread. The other process may be operating on a different computing device or server from the main process and thus may not be operating on the local disk associated with the main process. Identifying a sensitive data may include accessing sensitive data using an API, a pipe, a socket, an environmental variable, or any other interprocess communication technique. In another embodiment, identifying a sensitive data may include receiving a path to the sensitive data.

Step 640 of process 600 illustrates one example of identifying a sensitive data including at least one secret. At step 640, data holder 610 may send sensitive data such as a secret to main process 620. In an embodiment, data holder 610 may send the sensitive data using a secure IPC. Sending the sensitive data may include transmitting the data over an API, a pipe, a socket, an environment variable, or any other interprocess communication technique.

At step 645 of process 600, main process 620 may create a dummy file, or a placeholder file. In an embodiment, creating a dummy file may include generating a placeholder file based on the sensitive data. In an embodiment, the placeholder file may exclude the at least one secret. For example, the placeholder file may be of similar file type that the secondary process is expecting to access, but sensitive data or secret that might have been contained in a sensitive file may be omitted, removed, or excluded in the placeholder file. For example, the placeholder file may contain an asterisk ("*") instead of the actual sensitive data. In an embodiment, the replacement data used in the placeholder file may be the same character length as the sensitive data. For example, if the sensitive data is eight characters long (i.e., "PASSWORD"), the placeholder file may contain data containing eight asterisks instead of the sensitive data (i.e., "********"). Of course, placeholder characters other than asterisks may be used. In another embodiment, the placeholder file may be a blank or empty file. In some embodiments, the location of the placeholder file may be an unsecured location, for example, a local disk. As one example embodiment, a placeholder file may be a remote desktop protocol (RDP) file, though other files such as text files, csv files, presentation files, etc. may also be used.

At step 650 of process 600, main process 620 may invoke a secondary process in a suspended mode. Invoking in a suspended mode may generally include operations to launch the secondary process prior to making any system calls. For example, invoking a secondary process in a suspended mode may include assigning memory locations, loading operating system DLLs, or allocating resources but not yet recalling specific code from the secondary process. In some embodiments, securing the use of secondary processes using an interprocess communication bridge may include invoking, by the main process, a secondary process in a computing environment in a suspended mode, wherein the secondary process is configured to perform at least one operation on a file associated with the sensitive data. In an embodiment, the file associated with the sensitive data may be an RDP file or a text file. In an embodiment, invoking the secondary process in a suspended mode may include suspending the secondary process immediately upon its initial execution. For example, the primary process may assign memory locations or load background resources and then halt processing of any more code from the secondary process application. In other embodiments, the secondary process may be suspended before it processes any file system calls. The secondary process may be configured to perform at least one operation on a file associated with the sensitive data. For example, the secondary process may be configured to digitally sign the file associated with the sensitive data or it may be configured to manipulate data in the file associated with the sensitive data and write an updated file to a disk location by, for example, replacing an unsigned file with a signed file.

In some embodiments, operations may include making the placeholder file available to the secondary process. Making the placeholder file available to the secondary process may include directing the secondary process to a file location containing the placeholder file. As one example, the main process of the data holder may save the placeholder file on a disk associated with secondary process and may pass the placeholder file location to the secondary process immediately upon invoking the secondary process. When the secondary process is launched in a suspended mode, the secondary process may already have the placeholder file location as an argument.

At step 655 of process 600, main process 620 may inject one or more code element into secondary process 630. Injecting one or more code element into the secondary process 630 may include providing a code element to the secondary process 630 through the introduction of new code into the secondary process 630. For example, if the secondary process requires a certain environmental variable to run an operation, such as a file path, main process 620 may provide the code element by writing the file path to the secondary process. Aspects of securing the use of secondary processes using an interprocess communication bridge may include injecting, by the main process, at least one code element into the secondary process, the code element being configured to redirect the secondary process to the sensitive data. In an embodiment, injecting the one or more code element may include providing access to a secret based on an environmental variable, and may include at least one of a configuration file, an import file, or a request path. The code element may be configured to redirect the secondary process to the sensitive data. In one embodiment, the code element may be a dynamic-link library (DLL). In another embodiment, injecting the one or more code element may include injecting a hooking DLL into the secondary process. The hooking DLL may be configured to alter or augment the behavior of the secondary process by intercepting function calls or messages or events passed between software components. In yet another embodiment, redirecting the secondary process to the sensitive data may include redirecting the secondary process from the placeholder file to the sensitive data. In an embodiment, injecting at least one code element may include overwriting a read file system call of the secondary process. In another embodiment, injecting at least one code element may include overwriting a write file system call of the secondary process. Of course, injecting at least one code element may also include overwriting both a read file system call and a write file system call within a process, or may include other code elements.

At step 660 of process 600, secondary process may perform code element calls. Code element calls may be based on the injected code delivered to the secondary process 630 at step 655. In an illustrative embodiment where a code element in the form of a hooking DLL was provided at step 655 to the secondary process, the hooking DLL may override filesystem calls native to the secondary process 630. In this example, secondary process 630 may try to open the provided dummy file, and upon trying to read or write from this file reference, secondary process 630 may be redirected to the sensitive data sent at step 640 via a secure interprocess communication instead of the dummy file. Accordingly, while the dummy file may be stored in a local, unsecured location, the sensitive data may be accessed via the secure interprocess communication bridge. Once the injected code element logic is complete, for example, when the hooking process is complete in the hooking DLL example, the injected code logic may, at step 665, send a message to the main process 620 indicating the injected process is complete. At step 670, the secondary process may be resumed from the suspended mode. In an embodiment, the at least one code element may be configured to generate an indication that the at least one code element has been injected into the secondary process, and the secondary process may be resumed based on the indication. For example, generating an indication that the at least one code element has been injected into the secondary process may include a “done hooking message” issued to the main process when the at least one code element is a hooking DLL.

At step 675, process 600 may include the secondary process 630 reading the sensitive data due to the injected code element redirecting the location of the system calls to the secure IPC. At step 680, process 600 may include transmitting the sensitive data from the main process 620 to the secondary process 630. In an example embodiment, the secondary process 630 may retrieve the sensitive data via secure IPC under the assumption that the data came from the original filesystem location.

At step 685, secondary process 630 may work with the sensitive data provided by the secure IPC. Once the secondary process is resumed, the secondary process may perform the at least one operation using the sensitive data. For example, operations may include generating, by the secondary process, a modified sensitive data based on the sensitive data. In an embodiment, the modified sensitive data may be generated based on the result of the at least one operation performed by the secondary process using the sensitive data. In an embodiment, generating a modified sensitive data based on the result of the at least one operation may include applying a digital signature using the sensitive data. In an embodiment, the modified sensitive data may be data in the format of a signed remote desktop protocol file. In another embodiment, the data in the format of the signed remote desktop protocol file may include a signature block.

At step 690, secondary process 630 may write the modified sensitive data to the location redirected by the secure IPC. In an embodiment, instead of writing the modified sensitive data to a local disk, the modified sensitive data is redirected to the data holder 610 by way of the main process 620 acting as a bridge due to the injected code element logic.

At step 695, main process 620 may send output to the data holder 610. In an embodiment, output may include the modified sensitive data. In some embodiments, the operations may comprise receiving a request for the sensitive data from the data holder 610, or from another source. The operations may also further comprise providing the sensitive data to the data holder in response to the request.

One of skill in the art will appreciate that disclosed techniques for securing the use of secondary processes using an interprocess communication bridge improve over known security solutions used in software applications. For example, certain closed-source executables or processes may generate files containing sensitive data and may save them to an unsecure location. One example is “RDPSign.exe,” which signs RDP files and saves them to a local disk. Under the disclosed techniques, a placeholder file that does not include sensitive data may be generated by a main process. The secondary process may be launched in a suspended mode, and the main process may inject new code, such as a hooking DLL, to override the system calls called by the secondary process. The result may be that the secondary process reads the placeholder file, and as a result of the injected code, reads the sensitive data sent via secure IPC under the assumption that such data comes from the placeholder file. When performing an operation on the sensitive data, for example applying a digital signature to an RDP file, the secondary process may output modified sensitive data in the format of a signed remote desktop protocol file, and the secondary process may write the modified sensitive data to a secure location, for example, the memory of the main process, through the secure IPC instead of the local disk. In an example, the data holder may create a signed remote desktop protocol file using the modified sensitive data. Such code injection techniques may be used to secure black box processes that only support filesystem data retrieval by using secure IPC to send sensitive data to processes that are not designed to work with those IPC’s. Disclosed techniques enable processes that are restricted to filesystem calls to receive data from any source instead of just the physical disk, improving security.

Figure 7:
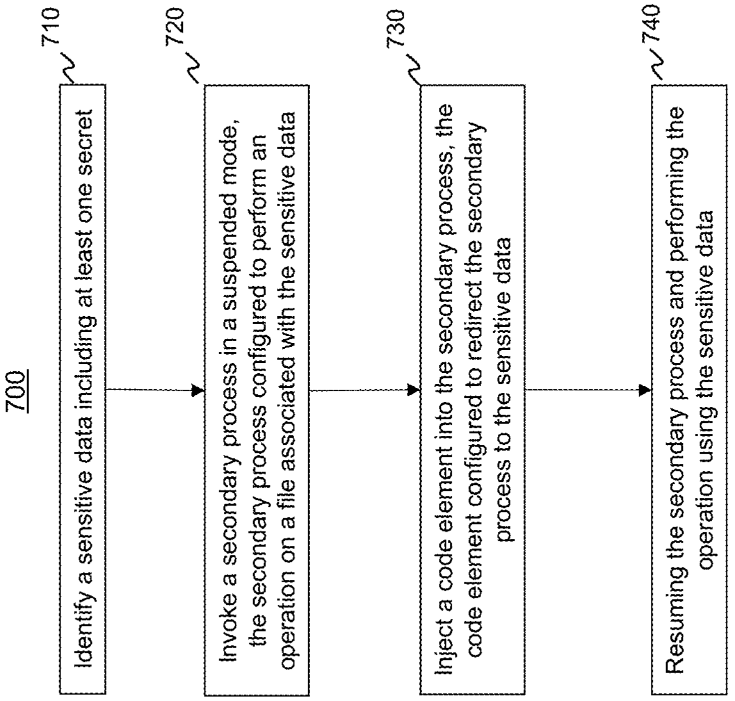
FIG. 7 is a flowchart depicting an exemplary process for securing the use of secondary processes using an interprocess communication bridge in accordance with disclosed embodiments.

FIG. 7 is a flowchart depicting an exemplary process for securing the use of secondary processes using an interprocess communication bridge in accordance with disclosed embodiments. Process 700 may be similar to process 600 described above. For example, process 700 may be performed by data holder 610, main process 620, one or more a computing devices 130, or a combination thereof. Accordingly, any of the various functions or elements described above with respect to process 600 equally apply to process 700, and vice versa.

At step 710, process 700 may include identifying sensitive data including at least one secret. Accordingly, step 710 may substantially correspond with step 640 of process 600. At step 720, process 700 may include invoking a secondary process in a suspended mode, the secondary process configured to perform an operation on a file associated with the sensitive data. Accordingly, step 720 may substantially correspond with step 650 of process 600.

At step 730, process 700 may include injecting a code element into the secondary process, the code element configured to cause the redirection of the secondary process to the sensitive data. Accordingly, step 730 may substantially correspond with step 655 of process 600.

At step 740, process 700 may include resuming the secondary process and performing the operation using the sensitive data. Accordingly, step 740 may substantially correspond with step 670 of process 600.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, mode-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing mode information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A non-transitory computer readable medium including instructions that, when executed by at least one processor, cause the at least one processor to perform operations for securing the use of secondary processes using an interprocess communication bridge, the operations comprising:

identifying, by a main process, a sensitive data including at least one secret;

invoking, by the main process, a secondary process in a computing environment in a suspended mode, wherein the secondary process is configured to perform at least one operation on a file associated with the sensitive data;

injecting, by the main process, at least one code element into the secondary process, the code element being configured to redirect the secondary process to the sensitive data; and resuming the secondary process, wherein the at least one operation is performed using the sensitive data.

2. The non-transitory computer readable medium of claim 1, wherein the operations further comprise generating a placeholder file based on the sensitive data, the placeholder file excluding the at least one secret.

3. The non-transitory computer readable medium of claim 1, wherein the operations further comprise generating, by the secondary process, a modified sensitive data based on the sensitive data.

4. The non-transitory computer readable medium of claim 1, wherein the injecting includes overwriting a read file system call of the secondary process.

5. The non-transitory computer readable medium of claim 1, wherein the injecting includes overwriting a write file system call of the secondary process.

6. The non-transitory computer readable medium of claim 2, wherein the operations further comprise making the placeholder file available to the secondary process.

7. The non-transitory computer readable medium of claim 2, wherein redirecting the secondary process to the sensitive data includes redirecting the secondary process from a location of the placeholder file to the sensitive data.

8. The non-transitory computer readable medium of claim 7, wherein the location of the placeholder file is an unsecured location.

9. The non-transitory computer readable medium of claim 3, wherein the operations further comprise receiving, from a data holder, a request for the modified sensitive data.

10. The non-transitory computer readable medium of claim 9, wherein the operations further comprise providing the modified sensitive data to the data holder in response to the request.

11. The non-transitory computer readable medium of claim 1, wherein identifying the sensitive data including at least one secret includes accessing the sensitive data via an interprocess communication bridge.

12. A computer-implemented method for securing the use of secondary processes using an interprocess communication bridge, the method comprising:

identifying, by a main process, a sensitive data including at least one secret;

invoking, by the main process, a secondary process in a computing environment in a suspended mode, wherein the secondary process is configured to perform at least one operation on a file associated with the sensitive data;

injecting, by the main process, at least one code element into the secondary process, the code element being configured to redirect the secondary process to the sensitive data; and resuming the secondary process, wherein the at least one operation is performed using the sensitive data.

13. The computer-implemented method of claim 12, wherein the method further comprises:

generating a modified sensitive data based on the sensitive data; and writing the modified sensitive data to a secure location.

14. The computer-implemented method of claim 13, wherein the at least one code element is further configured to generate an indication that the at least one code element has been injected into the secondary process, and wherein the secondary process is resumed based on the indication.

15. The computer-implemented method of claim 12, wherein the file associated with the sensitive data is a remote desktop protocol file.

16. The computer-implemented method of claim 13, wherein the modified sensitive data is data in the format of a signed remote desktop protocol file.

17. The computer-implemented method of claim 16, wherein data in the format of the signed remote desktop protocol file includes a signature block.

18. The computer-implemented method of claim 12, wherein the code element is a dynamic-link library.

19. The computer-implemented method of claim 12, wherein the secondary process is suspended immediately upon its initial execution.

20. The computer-implemented method of claim 12, wherein the secondary process is suspended before it processes any file system calls.

* * * * *